(12) United States Patent
Zhao et al.

(10) Patent No.: US 12,535,358 B2
(45) Date of Patent: Jan. 27, 2026

(54) SYSTEMS, METHODS, AND COMPUTER PROGRAM PRODUCTS FOR MULTI-MODEL EMISSION DETERMINATIONS

(71) Applicant: Rebellion Photonics, Inc., Houston, TX (US)

(72) Inventors: Chuan Zhao, Sugarland, TX (US); Quan Shen, Houston, TX (US); Patrick Charles O'Driscoll, Houston, TX (US)

(73) Assignee: Rebellion Photonics, Inc., Houston, TX (US)

( * ) Notice: Subject to any disclaimer, the term of this patent is extended or adjusted under 35 U.S.C. 154(b) by 826 days.

(21) Appl. No.: 17/675,521

(22) Filed: Feb. 18, 2022

(65) Prior Publication Data

US 2023/0266193 A1    Aug. 24, 2023

(51) Int. Cl.
   *G01J 5/00*    (2022.01)
   *G01J 3/28*    (2006.01)
   (Continued)

(52) U.S. Cl.
   CPC . *G01J 5/00* (2013.01); *G01J 3/28* (2013.01); *G01J 3/42* (2013.01); *G01J 5/0014* (2013.01);
   (Continued)

(58) Field of Classification Search
   CPC ........ G01J 5/00; G01J 2005/0077; G01J 3/28; G01J 3/42; G01J 5/0014; G01J 5/026;
   (Continued)

(56) References Cited

U.S. PATENT DOCUMENTS

| 10,684,216 B2 | 6/2020 | Wang |
| 2010/0078561 A1* | 4/2010 | Gorin ...................... G06T 7/254 |
| | | 250/338.5 |

(Continued)

FOREIGN PATENT DOCUMENTS

CN    107251118 A    10/2017

OTHER PUBLICATIONS

European search report Mailed on Jul. 5, 2023 for EP Application No. 23151782, 8 page(s).

(Continued)

*Primary Examiner* — Farhana A Hoque
*Assistant Examiner* — Joseph O Nyamogo
(74) *Attorney, Agent, or Firm* — Alston & Bird LLP

(57) ABSTRACT

Systems, methods, and computer program products for multi-model emission determinations are provided. An example imaging system includes an infrared (IR) imaging device configured to generate second IR image data of a first field of view of the IR imaging device at a second time and a computing device operably connected with the IR imaging device. The computing device receives the second IR image data of the first field of view from the IR imaging device and accesses a first detection model associated with the first field of view of the IR imaging device. The first detection model is generated based upon first IR image data of the first field of view of the IR imaging device generated at a first time. The computing device further generates first spectral absorption data based upon the second IR image data and the first detection model for detecting a fugitive emission.

10 Claims, 4 Drawing Sheets

(51) Int. Cl.
*G01J 3/42* (2006.01)
*G01J 5/02* (2022.01)
*G01M 3/00* (2006.01)
*G01M 3/38* (2006.01)
*G01N 21/3504* (2014.01)
*G06N 20/00* (2019.01)
*G06T 7/70* (2017.01)

(52) U.S. Cl.
CPC ............. *G01J 5/026* (2013.01); *G01M 3/002* (2013.01); *G01M 3/38* (2013.01); *G06N 20/00* (2019.01); *G06T 7/70* (2017.01); *G01J 2005/0077* (2013.01); *G01N 2021/3513* (2013.01); *G06T 2207/20081* (2013.01)

(58) Field of Classification Search
CPC ...... G01N 2021/3513; G01N 21/3504; G01M 3/002; G01M 3/38; G06T 7/0002; G06T 7/70; G06T 2207/20081; G06N 20/00
See application file for complete search history.

(56) References Cited

U.S. PATENT DOCUMENTS

| | | | |
|---|---|---|---|
| 2013/0286213 A1* | 10/2013 | Cetin | H04N 23/11 |
| | | | 348/164 |
| 2017/0358190 A1 | 12/2017 | Au et al. | |
| 2019/0187019 A1* | 6/2019 | Ekeroth | G01N 21/85 |
| 2019/0339159 A1 | 11/2019 | Israelsen | |
| 2020/0116583 A1 | 4/2020 | Hedberg | |
| 2020/0320659 A1 | 10/2020 | Whiting et al. | |
| 2021/0102931 A1* | 4/2021 | Kukreja | G01N 33/225 |
| 2022/0082409 A1* | 3/2022 | Ukil | G16Y 10/35 |

OTHER PUBLICATIONS

EP Office Action Mailed on Jun. 16, 2025 for EP Application No. 23151782, 4 page(s).
CN Office Action, including Search Report Mailed on Nov. 1, 2025 for CN Application No. 202310047075, 5 page(s).
English Translation of CN Office Action dated Nov. 1, 2025 for CN Application No. 202310047075, 6 page(s).

* cited by examiner

SYSTEMS, METHODS, AND COMPUTER PROGRAM PRODUCTS FOR MULTI-MODEL EMISSION DETERMINATIONS

TECHNOLOGICAL FIELD

Example embodiments of the present disclosure relate generally to imaging systems and, more particularly, to hyperspectral imaging to detect and quantify fugitive emissions.

BACKGROUND

In many environments, such as manufacturing facilities, drilling locations, pipelines, and/or the like, gases may be used, stored, transferred, moved, processed, etc. For example, a natural gas pipeline may transport natural gas (e.g., methane and/or the like) between locations. During transport, some gas may be emitted from such an example pipeline, such as due to a leak in the pipeline system (e.g., due to poor sealing at pipe junctions, an impact with the pipeline, etc.). In order to identify a leak and/or quantify the amount of gas emitted (e.g., a fugitive emission) from the leak, hyperspectral cameras may be used. The inventors have identified numerous deficiencies with the existing technologies in this field, the remedies for which are the subject of the embodiments described herein.

BRIEF SUMMARY

As described above, many industries and environments rely upon or otherwise leverage gases in performing various operations associated with these industries. For example, the natural gas industry may extract, transport, and process natural gas (e.g., methane and/or the like) for subsequent use in generating heat, generating electricity, fueling vehicles, etc. The emittance of this gas to an external environment (e.g., a fugitive emission), such as due to a leak in one or more systems, may result in large costs in lost product as well as the potential for large fines from, for example, governmental regulatory agencies. Furthermore, the leakage of gases such as methane may present a dangerous condition to workers or otherwise impact workplace safety. As such, the accurate detection and quantification of fugitive emissions (e.g., a leaking plume of gas) is of critical importance in order to maximize profit while preventing hazardous conditions. Furthermore, the accurate quantification of distinct fugitive emissions may be critical in the proper allocation of resources in addressing these emissions (e.g., efficient resource allowance in addressing leaks or the like).

Although the detection of fugitive emissions is important in the environments described above, many traditional systems fail to property quantify the quantity of gas emitted by such a fugitive emission. For example, these traditional systems may rely upon hand-held devices alongside field operators to determine the presence of a fugitive emission. Some conventional systems have attempted to remove the potential for operator error by introducing imaging devices to these determinations; however, these systems fail to provide the continuous and automated imaging solution described herein. By way of example, the total amount of gas emitted by a fugitive emission (e.g., gas leak) may vary based upon a number of factors (e.g., the size of the leak, the ambient temperature, the ambient pressure, the type of gas, etc.) and may further vary over the time period during which the leak is occurring. Furthermore, the temperature associated with a particular location within the image (e.g., represented by one or more pixels) may account for the temperature of any location, object, fluid, gas, etc. present or otherwise associated with this pixel. Said differently, temperature values or data associated with a particular pixel are influenced by the temperature at each location along a line extending from the imaging device to the limit of the device's resolution. An infrared (IR) imaging device or camera may determine a temperature for a particular pixel that is influenced by, for example, a leaking gas captured by the camera and associated with the particular pixel as well as the temperature of the foreground/background of the pixel. As such, the temperature of an example background may operate to influence the ability of the camera to properly quantify the presence or amount of gas at a particular location.

These determinations are further complicated by the varying environmental conditions at different locations observed by the IR imaging device. For example, IR imaging devices may tilt/pan to adjust the associated field of view (FOV) of the IR imaging device. In doing so, the IR imaging device may capture images (e.g., IR image data) of various locations, each of which may be associated with a variety of different conditions (e.g., ambient temperature, ambient pressure, type of gas, etc.). Traditional systems that attempt to detect and/or quantify gas leaks fail to properly account for a potential variability of these factors among different locations by relying upon a common model for gas detection at each of these distinct locations. Due to the use of a single, common model for all locations observed by the IR imaging devices of conventional systems, these systems fail to properly account for the impact of gas that may potentially exist in a particular FOV (e.g., gas burn into background) in initial determinations resulting in the inability to properly detect and/or quantify fugitive emissions with such a FOV, particularly when an imaging device's FOV is modified. For example, conventional systems may fail to account for "burn in" in which unintended properties associated with the foreground/background of an image are "burned into" the outputs of the imaging system, and the single model leveraged by these systems may therefore allow "burn in" associated with a particular physical location viewed by the system to improperly impact determinations at other physical locations.

To solve these issues and others, example implementations of embodiments of the present disclosure may leverage infrared (IR) imaging devices, such as those implemented in a hyperspectral camera implementation, to generate IR image data associated with a particular field of view at a current (e.g., second) time so as to provide a continuous imaging solution. A computing device operably connected with this IR image device may receive this current IR image data and access a detection model associated with the same field of view of the IR imaging device that is generated based upon IR image data of the IR imaging device from a prior time (e.g., first time). This detection model may be distinct from other detection models associated with distinct FOVs so as to provide a system that utilizes location-specific models in identifying fugitive emissions. Furthermore, this location specific detection model may be iteratively updated to account for the IR image data generated at the current time, such as when the IR imaging device is moving to another FOV (e.g., during a panning/tilting operation). In doing so, the embodiments described here may further reduce or minimize the computational burden on the computing device by limiting model updates to non-active times (e.g., prior to the generating of new IR image data at another FOV).

Apparatuses, methods, systems, devices, and associated computer program products are provided for multi-model fugitive emission determinations. An example imaging system may include an infrared (IR) imaging device configured to generate second IR image data of a first field of view of the IR imaging device at a second time and a computing device operably connected with the IR imaging device. The computing device may be configured to receive the second IR image data of the first field of view from the IR imaging device and access a first detection model associated with the first field of view of the IR imaging device. The first detection model may be generated based at least in part upon first IR image data of the first field of view of the IR imaging device generated at a first time. The computing device may further be configured to generate first spectral absorption data based upon the second IR image data and the first detection model and detect a fugitive emission within the first field of view based upon the first spectral absorption data.

In some embodiments, the first time is earlier in time than the second time.

In some embodiments, the computing device may be further configured to modify the first detection model based upon the second IR image data of the first field of view generated at the second time.

In some embodiments, the computing device may be further configured to cause movement of the IR imaging device to a second field of view such that the IR imaging device is configured to generate fourth IR image data of the second field of view of the IR imaging device at a fourth time.

In some further embodiments, the computing device may be further configured to modify the first detection model based upon the second IR image data of the first field of view generated at the second time during movement of the IR imaging device from the first field of view to the second field of view.

In some further embodiments, the computing device may be configured to cause movement of the IR imaging device according to a schedule of movement operations.

In some further embodiments, the computing device may be further configured to access a second detection model associated with the second field of view of the IR imaging device. In such an embodiment, the second detection model may be generated based at least in part upon third IR image data of the second field of view of the IR imaging device generated at a third time. In such an embodiment, the computing device may further generate second spectral absorption data based upon the fourth IR image data and the second detection model and detect a fugitive emission within the second field of view based upon the second spectral absorption data.

In some still further embodiments, the second detection model may be independent of the first detection model.

In some still further embodiments, the computing device may be further configured to modify the second detection model based upon the fourth IR image data of the second field of view generated at the fourth time.

In some still further embodiments, the third time may be earlier in time than the fourth time.

The above summary is provided merely for purposes of summarizing some example embodiments to provide a basic understanding of some aspects of the disclosure. Accordingly, it will be appreciated that the above-described embodiments are merely examples and should not be construed to narrow the scope or spirit of the disclosure in any way. It will be appreciated that the scope of the disclosure encompasses many potential embodiments in addition to those here summarized, some of which will be further described below.

BRIEF DESCRIPTION OF THE DRAWINGS

Having described certain example embodiments of the present disclosure in general terms above, reference will now be made to the accompanying drawings. The components illustrated in the figures may or may not be present in certain embodiments described herein. Some embodiments may include fewer (or more) components than those shown in the figures.

DETAILED DESCRIPTION

Figure 1:
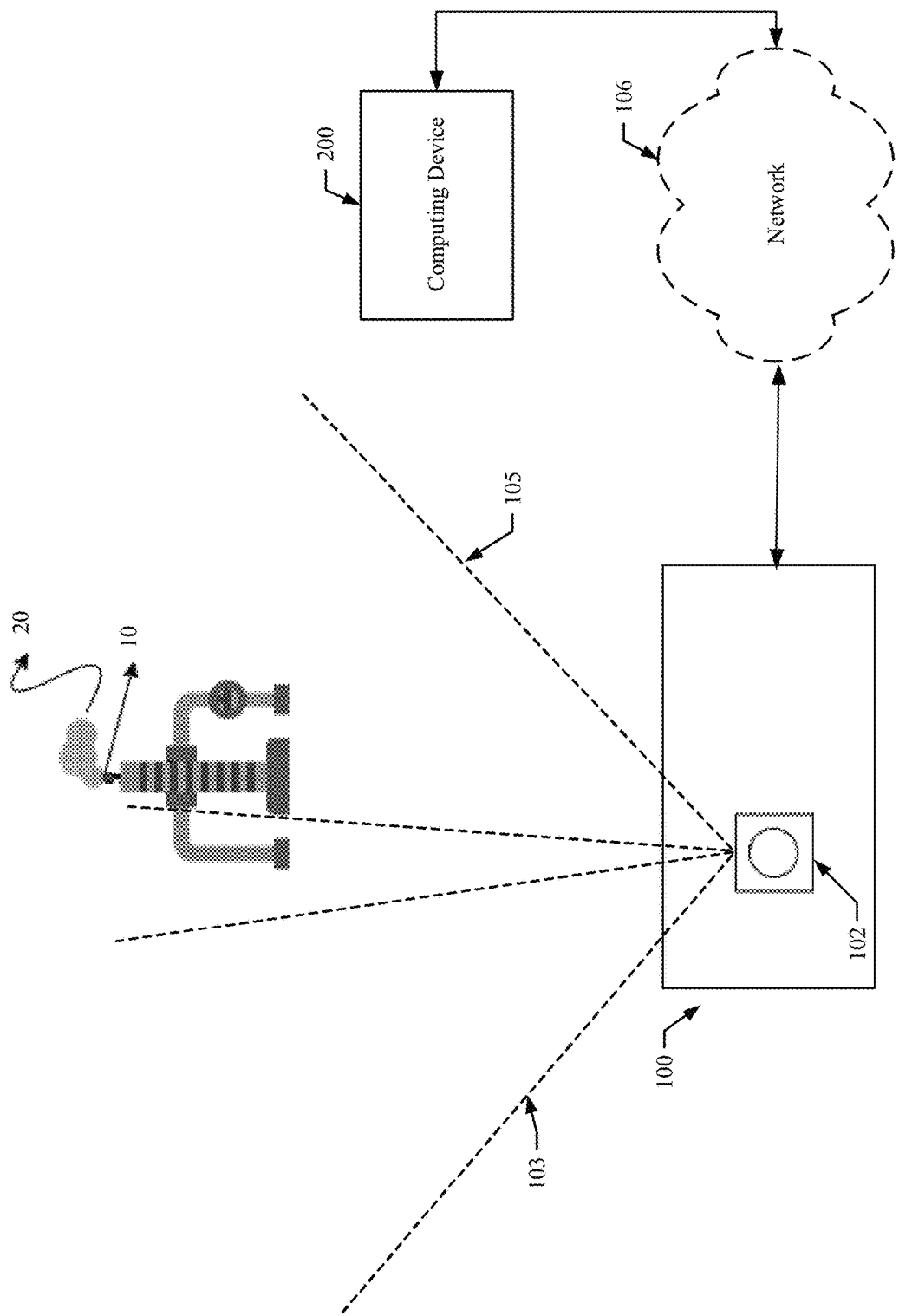
FIG. 1 illustrates an example imaging system in operation with a target gas leak (e.g., fugitive emission) in accordance with some example embodiments described herein.

Some embodiments of the present disclosure will now be described more fully hereinafter with reference to the accompanying drawings, in which some, but not all embodiments of the disclosure are shown. Indeed, this disclosure may be embodied in many different forms and should not be construed as limited to the embodiments set forth herein; rather, these embodiments are provided so that this disclosure will satisfy applicable legal requirements. Like numbers refer to like elements throughout. As used herein, the description may refer to a computing device of an example imaging system as an example "apparatus." However, elements of the apparatus described herein may be equally applicable to the claimed method and computer program product. Thus, use of any such terms should not be taken to limit the spirit and scope of embodiments of the present disclosure.

Definition of Terms

As used herein, the terms "data," "content," "information," "electronic information," "signal," "command," and similar terms may be used interchangeably to refer to data capable of being transmitted, received, and/or stored in accordance with embodiments of the present disclosure. Thus, use of any such terms should not be taken to limit the spirit or scope of embodiments of the present disclosure. Further, where a first device is described herein to receive data from a second device, it will be appreciated that the data may be received directly from the second device or may be received indirectly via one or more intermediary computing devices, such as, for example, one or more servers, relays, routers, network access points, base stations, hosts, and/or the like, sometimes referred to herein as a "network." Similarly, where a first device is described herein as sending data to a second device, it will be appreciated that the data may be sent directly to the second device or may be sent indirectly via one or more intermediary computing devices, such as, for example, one or more servers, remote servers, cloud-based servers (e.g., cloud utilities), relays, routers, network access points, base stations, hosts, and/or the like.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

As used herein, the phrases "in one embodiment," "according to one embodiment," "in some embodiments," and the like generally refer to the fact that the particular feature, structure, or characteristic following the phrase may be included in at least one embodiment of the present disclosure. Thus, the particular feature, structure, or characteristic may be included in more than one embodiment of the present disclosure such that these phrases do not necessarily refer to the same embodiment.

As used herein, the word "example" is used herein to mean "serving as an example, instance, or illustration." Any implementation described herein as "example" is not necessarily to be construed as preferred or advantageous over other implementations.

As used herein, the terms "IR imaging device" or "IR imager" refer to a device or devices capable of generating IR image data. Example IR imaging devices may include a thermal imaging camera, an IR imager, an IR camera, a thermographic camera, and/or the like that may generate IR image data indicative of a field of view (FOV) of the IR imaging device. Said differently, the IR imaging device may include any device, apparatus, system, etc. capable of detecting infrared energy/radiation and converting said infrared energy/radiation into a corresponding electronic signal (e.g., IR image data). By way of a non-limiting example, the IR imaging device may include an IR camera configured to capture IR energy emitted by a fugitive emission from an example emission source as described hereafter located within a FOV associated with the IR imaging device. The IR imaging device may also be associated with a first filter that defines a first band-pass frequency (e.g., a device that passes frequencies within a certain range and attenuates frequencies outside this range). As described hereafter, this first filter may be configured to pass IR radiation having a frequency associated with the fugitive emission (e.g., gas) for which the imaging device is design to monitor (e.g., methane or the like) to the IR imaging device.

The IR imaging devices described herein may further be configured to generate IR image data associated with or otherwise indicative or various FOVs of the IR imaging device. As detailed herein, the IR imaging device may be configured to pan, tilt, or otherwise modify the physical location at which the IR imaging device is directed. By way of example, an example IR imaging device may move so as to generate IR image data of a plurality of locations (e.g., a first location, a second location, . . . a $n^{th}$ location) as determined by a schedule of movement operations. Additionally or alternatively, the IR imaging device may move so as to generate IR image data of each physical location capable of being viewed by the IR imaging device. In other words, the present disclosure contemplates that the IR imaging devices described herein are capable of generating IR image data associated with any physical location based upon the intended application of the systems described herein. Furthermore, although described herein with reference to an imaging device configured to generate IR image data indicative of a FOV of the IR imaging device, the present disclosure contemplates that the techniques described herein may be applicable to any imaging device without limitation. Said differently, the present disclosure contemplates that the use of IR image data in the example embodiments described hereafter is used solely as an example in that other forms, types, etc. of image data may be used based upon the intended application of the imaging system.

As used herein, the term "computing device" refers to any user device, controller, object, or system which may be in physical or network communication with an IR imaging device as described hereafter. For example, the computing device may refer to a wireless electronic device configured to perform various IR image related operations in response to second IR image data generated by the IR imaging device. The computing device may be configured to communicate with the IR imaging device via Bluetooth, NFC, Wi-Fi, 3G, 4G, 5G protocols, and the like. In some instances, the computing device may comprise the IR imaging device (e.g., an integrated configuration).

As used herein, the terms "fugitive emission," "gas leak," "gas plume," and/or "gas leak plume" may refer to a collection of gas atoms or particles that include vast separation between individual atoms or particles. Such a gas may leak or otherwise be emitted from a containing vessel (e.g., natural gas pipeline or the like) or an emission source and may be formed as a plume or column. This plume may be a vertical body of a first fluid (e.g., the leaking gas) moving relative or through another second fluid (e.g., the ambient air). As would be evident in light of the present disclosure, the intensity of the gas may dissipate as the distance between the leaking gas and the source of the leak increases. For example, a gas leak from a pipeline that contains methane gas may result in a gas plume of methane gas emitted from the pipeline such that the intensity (e.g., concentration) of methane gas decreases as the distance between the particles of methane gas and the location of the leakage increases. Although described herein with reference to an example methane gas application, the present disclosure contemplates that the imaging system(s) described herein may be configured for use with gas of any type, concentration, etc.

As used herein, the term "computer-readable medium" refers to non-transitory storage hardware, non-transitory storage device or non-transitory computer system memory that may be accessed by a computing device, a microcomputing device, a computational system or a module of a computational system to encode thereon computer-executable instructions or software programs. A non-transitory "computer-readable medium" may be accessed by a computational system or a module of a computational system to retrieve and/or execute the computer-executable instructions or software programs encoded on the medium. Exemplary non-transitory computer-readable media may include, but are not limited to, one or more types of hardware memory, non-transitory tangible media (for example, one or more magnetic storage disks, one or more optical disks, one or more USB flash drives), computer system memory or random access memory (such as, DRAM, SRAM, EDO RAM), and the like.

Having set forth a series of definitions called-upon throughout this application, an example system architecture and example apparatus is described below for implementing example embodiments and features of the present disclosure.

Device Architecture and Example Apparatus

With reference to FIG. 1, an example imaging system 100 is illustrated with an IR imaging device 102 operably coupled with a computing device 200 via a network 106. As defined above, the IR imaging device 102 may comprise a device capable of generating IR image data and may be a thermal imaging camera, an IR imager, an IR camera, a thermographic camera, and/or the like. The IR imaging device 102 may be associated a plurality of FOVs based upon the position of the IR imaging device 102 and/or the time at which the IR image data is generated. For example, the IR imaging device 102 may be associated with a FOV 103 at a second time such that the IR image data generated by the IR imaging device 102 at the second time is associated with or otherwise indicative of the FOV 103. In other words, the FOV 103 may refer to the observable area within which the IR imaging device 102 may capture images (e.g., generates IR image data) at a particular time (e.g., second time). As described hereafter, in some embodiments, the IR imaging device 102 may be positioned or oriented such that an emission source 10 is physically located within the FOV 103 of the IR imaging device 102. Said differently, the FOV 103 of the IR imaging device 102 may be such that second IR image data generated by the IR imaging device 102 (e.g., captured IR images of the FOV 103) may include IR image data indicative of or otherwise associated with the emission source 10 (e.g., so as to capture IR image data of the fugitive emission 20). The present disclosure contemplates that the IR imaging device 102 may be positioned at any physical location and at any orientation based upon the intended application of the system 100. Furthermore, the present disclosure contemplates that the FOV 103 may be varied based upon the operating parameters of the IR imaging device 102.

In operation, the positioning of the IR imaging device 102 may vary so as to modify the field of view of the IR imaging device 102. For example, the computing device 200 may cause (e.g., via transmitted instructions or the like) the IR imaging device 102 to move from the first FOV 103 to the second FOV 105 as shown in FIG. 1. For example, the IR imaging device 102 may be associated with a FOV 103 at a second time such that the IR image data generated by the IR imaging device 102 at the second time is associated with or otherwise indicative of the FOV 103. In other words, the first FOV 103 may refer to the observable area within which the IR imaging device 102 may capture images (e.g., generates IR image data) at the second time. Subsequently, the IR imaging device 102 may tilt, pan, pivot, or otherwise move to the second FOV 105. The IR imaging device 102 may then be associated with the second FOV 105 at a fourth time such that the IR image data generated by the IR imaging device 102 at the fourth time is associated with or otherwise indicative of the FOV 105. In other words, the second FOV 105 may refer to the observable area within which the IR imaging device 102 may capture images (e.g., generates IR image data) at the fourth time.

As described hereafter, in some embodiments, the IR imaging device 102 may be positioned or oriented such that an emission source 10 is physically located within the FOV 103 and/or the FOV 105 of the IR imaging device 102. Said differently, the FOV 103 and/or the FOV 105 of the IR imaging device 102 may be such that IR image data generated by the IR imaging device 102 (e.g., captured IR images of the FOV 103 and/or the FOV 105) may include IR image data indicative of or otherwise associated with the emission source 10 (e.g., so as to capture IR image data of the fugitive emission 20). The present disclosure contemplates that the IR imaging device 102 may be positioned at any physical location and at any orientation based upon the intended application of the system 100. Furthermore, the present disclosure contemplates that the FOV 103 and/or FOV 105 may be varied based upon the operating parameters of the IR imaging device 102.

Although described and illustrated herein with a single IR imaging device 102, the present disclosure contemplates that the imaging system 100 may include any number of IR imaging devices have any number of positions, fields of view, and/or the like. For example, the imaging system 100 may include a second IR imaging device (not shown) that may operate similarly to the IR imaging device 102. As described above, the imaging system 100 of the present disclosure may be positioned proximate an emission source 10 (e.g., a pipeline or any feature, vessel, container, etc. from which gas may leak) so as to detect and quantify a fugitive emission 20 emitted from the emission source 10. The positioning may be such that a distance exists between the emission source 10 and, by association, the fugitive emission 20. As would be evident in light of the relative position of the IR imaging device 102 and an example second IR imaging device (not shown), the IR image data generated by the IR imaging device 102 and the IR image data generated by the second IR imaging device (not shown) may differ due to the different perspectives of these devices. As such, a first feature (e.g., geometric center, center of mass, etc.) or set of features (e.g., corners, edges, contours, etc.) for the fugitive emission 20 in the IR image data of the IR imaging device 102 may differ from a second feature (e.g., geometric center, center of mass, etc.) or set of features (e.g., corners, edges, contours, etc.) for the same fugitive emission 20 in the IR image data generated by the example second IR imaging device (not shown). As would be evident in light of the present disclosure, the techniques described herein may be capable of leveraging multiple sources of IR image data (e.g., IR imaging device 102, second IR imaging device (not shown), etc.) in order to provide a robust solution for total loss determinations. As such, any disparity between the feature(s) of the fugitive emission 20 in the IR image data of the IR imaging device 102 and the feature(s) of the fugitive emission 20 in the IR image data of the example second IR imaging device (not shown) may be determined, accounted for, or otherwise considered in order to ensure accurate spectral absorption determinations.

With continued reference to FIG. 1, the imaging system 100 may include a computing device 200 that is connected with the IR imaging device 102 over a network 106. In some instances, the IR imaging device 102 may comprise the computing device 200, in whole or in part. In other instances, the IR imaging device 102, and the computing device 200 may be formed as a single, integrated device. The computing device 200 may include circuitry, networked processors, or the like configured to perform some or all of the apparatus-based (e.g., IR image based) processes described herein and may be any suitable processing device and/or network server. In this regard, the computing device 200 may be embodied by any of a variety of devices. For example, the computing device 200 may be configured to receive/transmit data (e.g., IR image data) and may include any of a variety of fixed terminals, such as a server, desktop, or kiosk, or it may comprise any of a variety of mobile terminals, such as a portable digital assistant (PDA), mobile telephone, smartphone, laptop computer, tablet computer, or in some embodiments, a peripheral device that connects to one or more fixed or mobile terminals. Example embodiments contemplated herein may have various form factors and designs but will nevertheless include at least the components illustrated in FIG. 2 and described in connection therewith. The computing device 200 may, in some embodiments, comprise several servers or computing devices performing interconnected and/or distributed functions. Despite the many arrangements contemplated herein, the computing device 200 is shown and described herein as a single computing device to avoid unnecessarily overcomplicating the disclosure.

The network 106 may include one or more wired and/or wireless communication networks including, for example, a wired or wireless local area network (LAN), personal area network (PAN), metropolitan area network (MAN), wide area network (WAN), or the like, as well as any hardware, software and/or firmware for implementing the one or more networks (e.g., network routers, switches, hubs, etc.). For example, the network 106 may include a cellular telephone, mobile broadband, long term evolution (LTE), GSM/EDGE, UMTS/HSPA, IEEE 802.11, IEEE 802.16, IEEE 802.20, Wi-Fi, dial-up, and/or WiMAX network. Furthermore, the network 106 may include a public network, such as the Internet, a private network, such as an intranet, or combinations thereof, and may utilize a variety of networking protocols now available or later developed including, but not limited to TCP/IP based networking protocols. In some embodiments, the network 106 may refer to a collection of wired connections such that the IR imaging device 102 and/or the computing device 200 may be physically connected, via one or more networking cables or the like.

Figure 2:
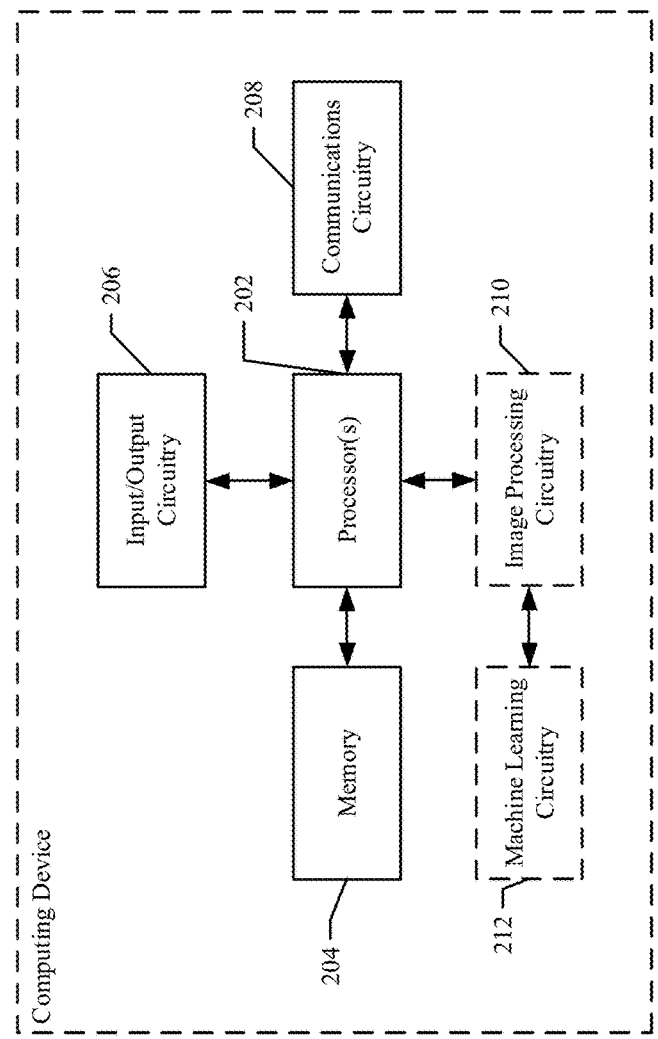
FIG. 2 illustrates a schematic block diagram of example circuitry that may perform various operations, in accordance with some example embodiments described herein.

As illustrated in FIG. 2, the computing device 200 may include a processor 202, a memory 204, input/output circuitry 206, and communications circuitry 208. Moreover, the computing device 200 may include image processing circuitry 210 and/or machine learning circuitry 212. The computing device 200 may be configured to execute the operations described below in connection with FIGS. 3-4. Although components 202-212 are described in some cases using functional language, it should be understood that the particular implementations necessarily include the use of particular hardware. It should also be understood that certain of these components 202-212 may include similar or common hardware. For example, two sets of circuitry may both leverage use of the same processor 202, memory 204, communications circuitry 208, or the like to perform their associated functions, such that duplicate hardware is not required for each set of circuitry. The use of the term "circuitry" as used herein includes particular hardware configured to perform the functions associated with respective circuitry described herein. As described in the example above, in some embodiments, various elements or components of the circuitry of the computing device 200 may be housed within the IR imaging device 102. It will be understood in this regard that some of the components described in connection with the computing device 200 may be housed within one or more of the devices of FIG. 1, while other components are housed within another of these devices, or by yet another device not expressly illustrated in FIG. 1.

Of course, while the term "circuitry" should be understood broadly to include hardware, in some embodiments, the term "circuitry" may also include software for configuring the hardware. For example, although "circuitry" may include processing circuitry, storage media, network interfaces, input/output devices, and the like, other elements of the computing device 200 may provide or supplement the functionality of particular circuitry.

In some embodiments, the processor 202 (and/or co-processor or any other processing circuitry assisting or otherwise associated with the processor) may be in communication with the memory 204 via a bus for passing information among components of the computing device 200. The memory 204 may be non-transitory and may include, for example, one or more volatile and/or non-volatile memories. In other words, for example, the memory may be an electronic storage device (e.g., a non-transitory computer readable storage medium). The memory 204 may be configured to store information, data, content, applications, instructions, or the like, for enabling the computing device 200 to carry out various functions in accordance with example embodiments of the present disclosure.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the computing device, and/or remote or "cloud" processors.

In an example embodiment, the processor 202 may be configured to execute instructions stored in the memory 204 or otherwise accessible to the processor 202. Alternatively or additionally, the processor 202 may be configured to execute hard-coded functionality. As such, whether configured by hardware or by a combination of hardware with software, the processor 202 may represent an entity (e.g., physically embodied in circuitry) capable of performing operations according to an embodiment of the present disclosure while configured accordingly. Alternatively, as another example, when the processor 202 is embodied as an executor of software instructions, the instructions may specifically configure the processor 202 to perform the algorithms and/or operations described herein when the instructions are executed.

The computing device 200 further includes input/output circuitry 206 that may, in turn, be in communication with processor 202 to provide output to a user and to receive input from a user, user device, or another source. In this regard, the input/output circuitry 206 may comprise a display that may be manipulated by a mobile application. In some embodiments, the input/output circuitry 206 may also include additional functionality including a keyboard, a mouse, a joystick, a touch screen, touch areas, soft keys, a microphone, a speaker, or other input/output mechanisms. The processor 202 and/or user interface circuitry comprising the processor 202 may be configured to control one or more functions of a display through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the computing device 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s). These signals may be transmitted by the computing device 200 using any of a number of wireless personal area network (PAN) technologies, such as Bluetooth® v1.0 through v3.0, Bluetooth Low Energy (BLE), infrared wireless (e.g., IrDA), ultra-wideband (UWB), induction wireless transmission, or the like. In addition, it should be understood that these signals may be transmitted using Wi-Fi, Near Field Communications (NFC), Worldwide Interoperability for Microwave Access (WiMAX) or other proximity-based communications protocols.

The image processing circuitry 210 includes hardware components designed to analyze the IR image data so as to convert IR image data into spectral absorption data in accordance with one or more radiative transfer models leveraged by the system 100. The image processing circuitry 210 may further access one or more detections models generated based upon various prior iterations of IR image data so as to detect a fugitive emission associated with the field of view of an example IR imaging device. Image processing circuitry 210 may utilize processing circuitry, such as the processor 202, to perform its corresponding operations, and may utilize memory 204 to store collected information. In some instances, the image processing circuitry 210 may further include machine learning circuitry 212 that includes hardware components designed to leverage artificial intelligence, supervised learning, unsupervised learning, etc. to analyze IR image data so as to iteratively detect the fugitive emission. By way of example, machine learning circuitry 212 may comprise or leverage an artificial neural network or convolutional neural network trained on at least image data of a plurality of captured IR image data associated with gas leaks or plumes and/or user confirmation to improve subsequent operation of the operations described herein. The machine learning circuitry 212 may also utilize processing circuitry, such as the processor 202, to perform its corresponding operations, and may utilize memory 204 to store collected information.

It should also be appreciated that, in some embodiments, the image processing circuitry 210 and/or the machine learning circuitry 212 may include a separate processor, specially configured field programmable gate array (FPGA), or application specific interface circuit (ASIC) to perform its corresponding functions. In addition, computer program instructions and/or other type of code may be loaded onto a computer, processor or other programmable circuitry to produce a machine, such that the computer, processor other programmable circuitry that execute the code on the machine create the means for implementing the various functions, including those described in connection with the components of computing device 200.

As described above and as will be appreciated based on this disclosure, embodiments of the present disclosure may be configured as apparatuses, systems, methods, and the like. Accordingly, embodiments may comprise various means including entirely of hardware or any combination of software with hardware. Furthermore, embodiments may take the form of a computer program product comprising instructions stored on at least one non-transitory computer-readable storage medium (e.g., computer software stored on a hardware device). Any suitable computer-readable storage medium may be utilized including non-transitory hard disks, CD-ROMs, flash memory, optical storage devices, or magnetic storage devices.

Example Location Specific Model Emission Determinations

Figure 3:
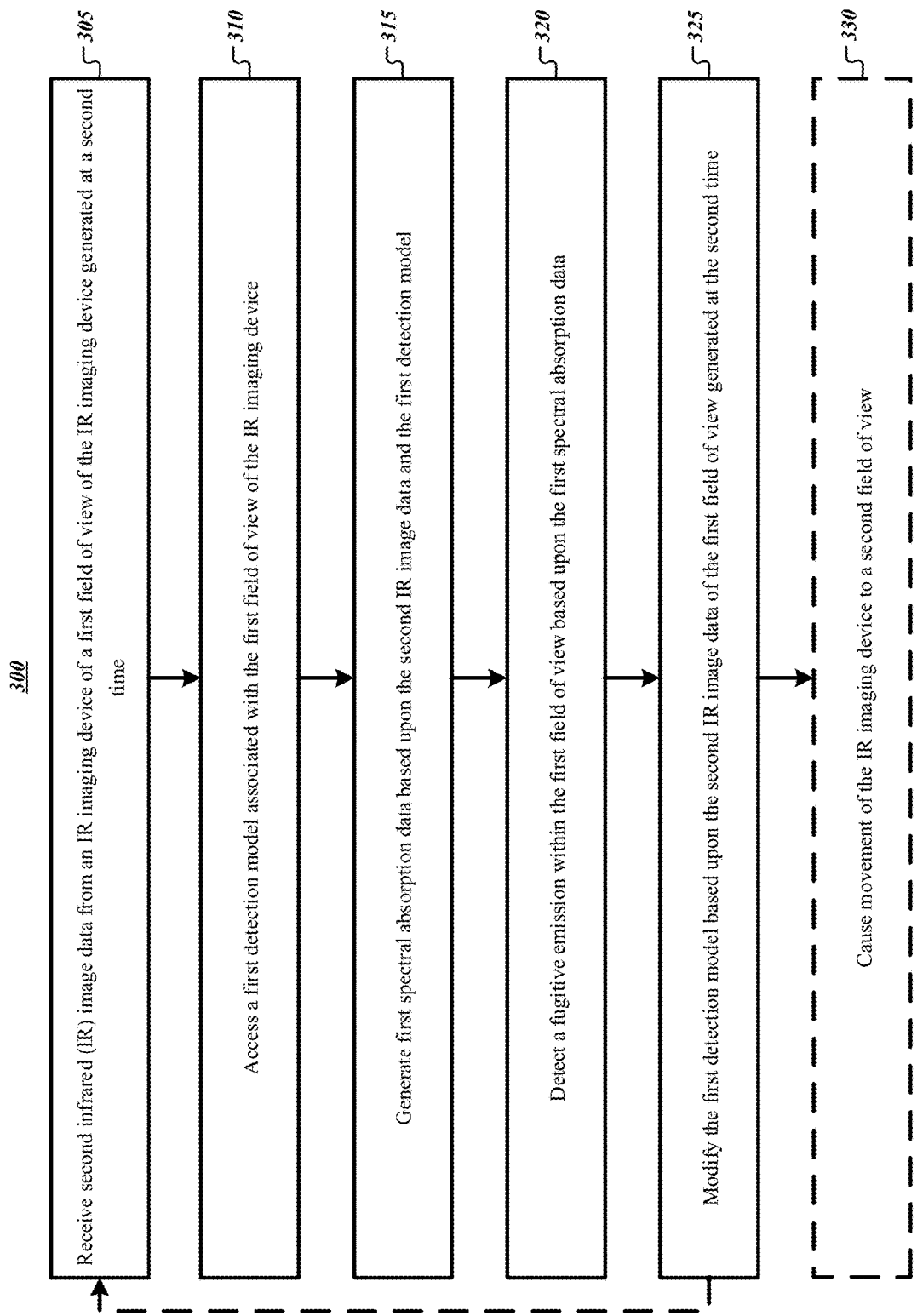
FIG. 3 illustrates an example flowchart for location specific model emission determinations and model modification, in accordance with some example embodiments described herein.

FIG. 3 illustrates a flowchart containing a series of operations for location specific model emission determinations and model modification. The operations illustrated in FIG. 3 may, for example, be performed by, with the assistance of, and/or under the control of an apparatus (e.g., computing device 200), as described above. In this regard, performance of the operations may invoke one or more of processor 202, memory 204, input/output circuitry 206, communications circuitry 208, image processing circuitry 210, and/or machine learning circuitry 212.

As shown in operation 305, the apparatus (e.g., computing device 200) includes means, such as processor 202, communications circuitry 208, image processing circuitry 210, or the like, for receiving second IR image data from an IR imaging device 102 associated with a first FOV 103 of the IR imaging device 102 generated at a second time. The second IR image data generated by the IR imaging device 102 may include a plurality of data entries, one or more of which may be associated with particular pixels that represent the first FOV 103 of the IR imaging device 102. As shown in FIG. 1, the second IR image data may include one or more data entries associated with or otherwise indicative of the fugitive emission 20 from the emission source 10. For example, the second IR image data may be indicative of the intensity of the IR radiation received by the IR imaging device 102 for each pixel captured for the first FOV 103. As described above, the IR imaging device 102 may also be associated with a first filter that defines a first band-pass frequency (e.g., a device that passes frequencies within a certain range and attenuates frequencies outside this range). This first filter may be configured to pass IR radiation having a frequency associated with the gas (e.g., fugitive emission 20) for which the IR imaging device 102 is design to monitor (e.g., methane or the like) to the IR imaging device 102.

In embodiments in which the computing device 200 and the IR imaging device 102 are contained within a common device or integrated device (e.g., the computing device 200 comprises the IR imaging device 102), the second IR image data may be received by the computing device 200 as part of normal operation of the IR imaging device 102 (e.g., an internal transmission, if any). In other embodiments in which the computing device 200 is located separate from the IR imaging device 102, such as connected via network 106, the computing device 200 may be configured to receive the second IR image data from the IR imaging device 102 in response to generation of the second IR image data. Said differently, each instance of second IR image data generation may be transmitted to the computing device 200 upon generation. In other embodiments, the computing device 200 may periodically (e.g., according to a defined rate or sampling protocol) request second IR image data from the IR imaging device 102. In such an example, the generation of the second IR image data may refer to IR image data generated by the IR imaging device 102 at a current time (e.g., second time). In other words, the second time may refer to the time at which the IR imaging device 102 generates IR image data of the first FOV 103 (e.g., second IR image data).

In some embodiments, the second IR image data may be generated by the IR imaging device 102 and/or transmitted to the computing device 200 in response to detection of a fugitive emission 20 within the first FOV 103 of the IR imaging device 102. By way of example, the generation of the second IR image data may be responsive to a change in the IR radiation received by the IR imaging device 102, such as instances in which a fugitive emission 20 within the first FOV 103 of the IR imaging device 102 becomes present or becomes absent. Said differently, the IR imaging device 102 may be configured to generate second IR image data in an instance in which the fugitive emission 20 is present within the first FOV 103. Furthermore, in some embodiments, the IR imaging device 102 may continuously generate second IR image data, and, in response to a detection of a fugitive emission 20 or otherwise, the IR imaging device 102 may transmit a request containing the second IR image data to the computing device 200.

As shown in operation 310, the apparatus (e.g., computing device 200) includes means, such as processor 202, communications circuitry 208, image processing circuitry 210, or the like, for accessing a first detection model associated with the first FOV 103 of the IR imaging device 102. The first detection model may be distinctly associated with the first FOV 103 in that the first detection model is trained solely on IR image data associated with the first FOV 103. For example, the first detection model may be generated based at least in part upon first IR image data of the first FOV 103 of the IR imaging device 102 generated at a first time that is earlier in time that the second time (e.g., the time at which the second IR image data is generated). Said differently, the computing device 200 may iteratively receive IR image data generated by the IR imaging device 102 at various times that is associated with the first FOV 103. By way of a particular example, the IR imaging device 102 may, according to a schedule of movement operations as described hereafter, pan, tilt, pivot, or otherwise modify its position such that the first FOV 103 changes, such as to a second FOV 105. This schedule of movement operations, however, may be such that the IR imaging device 102 iteratively returns to a position directed at the first FOV 103. As such, the first detection model may similarly iteratively receive IR image data that is associated with the first FOV 103. Although described hereinafter with reference to a first detection model that is generated based upon prior-in-time IR image data (e.g., IR image data generated at the first time), the present disclosure contemplates that the first detection model may similarly be used as part of future determinations or predictions. By way of example, the first detection model may be accessed as part of an initialization protocol in that the first detection model may have yet to be trained on IR image data. As such, the operations described herein may be applicable to instances in which the first detection model is used for such predictions, state determinations, etc. in the absence of IR image data generated at a time that is earlier in time than the time at which the first detection model is accessed.

The first detection model, as described above, may be independent of other detection models (e.g., a second detection model) leveraged by the system 100. By way of continued example, the first detection model may only be associated with the first FOV 103 so as to avoid an unintentional impact of IR image data associated with other FOVs on the IR image-based determinations associated with the first FOV 103. As such, the access by the computing device at operation 310 of the first detection model may only occur in presence of IR image data associated with the first FOV 103 (e.g., or in the absence of IR image data associated with other FOVs). In some embodiments described hereafter with reference to operation 325, the first detection model may be accessed, modified, or otherwise used during a movement operation of the IR imaging device from the first FOV 103 such that the subsequent generation of IR image data associated with another FOV (e.g., second FOV 105) halts access to the first detection model. In some embodiments, the first detection model may be commonly stored amongst a plurality of detection models and selectively accessed by the computing device 200, such as in response to receipt of IR image data (e.g., second IR image data) from the IR imaging device associated with the first FOV 103. To this end and as described more fully herein with reference to FIG. 4, the computing device 200 may be configured to access a plurality of independent detection models each of which are associated with distinct FOVs of the IR imaging device 102.

As shown in operation 315, the apparatus (e.g., computing device 200) includes means, such as processor 202, communications circuitry 208, image processing circuitry 210, or the like, for generating spectral absorption data based upon the second IR image data and the first detection model. As would be evident in light of the present disclosure, the second IR image data received at operation 305 may refer to a hyperspectral image cube in which a given x/y location or position in a traditional red/blue/green (rgb) visual camera also includes various IR radiation values (e.g., lambda 1, lambda 2, etc.) indicative of the intensity of the IR radiation received by the IR imaging device 102 for each pixel captured for the first FOV 103. In order to convert this IR image data for use in subsequent determinations, the computing device 200 may leverage one or more radiative transfer models. Radiative transfer may refer to the energy transfer in the form of electromagnetic radiation that propagates through an environment and is affected by absorption, emission, and/or scattering. A radiative transfer model may operate to estimate the absorption observed by the IR imaging device 102 in that the second IR image data may be supplied to the radiative transfer model as inputs, and the radiative transfer model may, for example, output various parameters associated with each pixel within the second IR image data. In this way, the first detection model may, in whole or in part, operate as a radiative transfer model trained on IR image data of the first FOV 103.

As would be evident in light of the present disclosure, the spectral absorption data may refer to the spectrum of absorption lines, bands, etc. that may result from the radiation (e.g., light) produced by a heated source (e.g., having a temperature differential with an ambient environment of the source (e.g., fugitive emission 20)). By way of a non-limiting example, the source (e.g., fugitive emission 20) that produces a continuous spectrum passes through a relatively cooler gas, and the associated absorption spectrum is indicative of the fraction of incident electromagnetic radiation absorbed by the material over a range of frequencies. Although described with reference to a relatively cooler gas, the present disclosure contemplates that the absorption spectrum may be generated when a relatively warmer background light passes through a relatively cooler source (e.g., fugitive emission 20), or a relatively cooler background light passes through a relatively warmer source (e.g., a negative absorption example). Such a spectrum as associated with the spectral absorption data, may be used as described in operation 320 to detect a fugitive emission (e.g., the presence or an amount of gas) in a particular set of second IR image data. Although described herein with reference to an example radiative transfer model operating in whole or in part as the first detection model, the present disclosure contemplates that any mechanism for converting IR image data to spectral absorption data may be used by the computing device 200, including but not limited to, various absorption estimation models, absorption generation models, and/or the like.

Thereafter, as shown in operation 320, the apparatus (e.g., computing device 200) includes means, such as processor 202, communications circuitry 208, image processing circuitry 210, machine learning circuitry 212, or the like, for determining a gas amount associated with the fugitive emission based upon the spectral absorption data. As described above, the spectral absorption data generated based upon the second IR image data may be used to determine or otherwise estimate the presence or concentration of gas (e.g., fugitive emission 20) for each pixel due to the difference between energy levels for the absorption lines or bands of distinct elements at various wavelengths. As such, the present disclosure contemplates that the computing device 200 may operate to determine an amount of gas associated with the second IR image data (e.g., represented by the pixels captured by the IR imaging device 102 at a particular time) via various techniques, including but not limited to foreground estimations, background estimations, times series analyses, or the like. By way of example, the computing device 200 may determine a gas amount that refers to the path-concentration on a pixel by pixel basis of the second IR image data (e.g., in parts-per-million-meter (ppm-m) or the like).

Thereafter, as shown in operation 320, the apparatus (e.g., computing device 200) includes means, such as processor 202, communications circuitry 208, image processing circuitry 210, machine learning circuitry 212, or the like, for detecting a fugitive emission 20 within the first FOV 103 based upon the first spectral absorption data. As described above, the first spectral absorption data generated based upon the second IR image data and the first detection model may be used to determine or otherwise estimate the presence or concentration of gas (e.g., fugitive emission 20) for each pixel due to the difference between energy levels for the absorption lines or bands of distinct elements at various wavelengths. As such, the present disclosure contemplates that the computing device 200 may operate to determine an amount of gas associated with the second IR image data (e.g., represented by the pixels captured by the IR imaging device 102 at the second time) via various techniques, including but not limited to foreground estimations, background estimations, times series analyses, or the like. By way of example, the computing device 200 may determine a gas amount that refers to the path-concentration on a pixel by pixel basis of the second IR image data as described above. Such a gas amount may, based upon comparisons with one or more thresholds, be used to determine the presence or absence of a fugitive emission 20 in the first FOV 103.

Thereafter, as shown in operation 325, the apparatus (e.g., computing device 200) includes means, such as processor 202, communications circuitry 208, image processing circuitry 210, machine learning circuitry 212, or the like, for modifying the first detection model based upon the second IR image data of the first FOV 103 generated at the second time. As described above, the first detection model may be distinctly associated with the first FOV 103 in that the first detection model is trained solely on IR image data associated with the first FOV 103. As such, the first detection model may be similarly trained based upon the second IR image data generated by the IR imaging device 102 at the second time of the first FOV 103 so as to improve subsequent determinations associated with the first FOV 103. Given that the first detection model may only be associated with the first FOV 103 so as to avoid an unintentional impact of IR image data associated with other FOVs on the IR image-based determinations associated with the first FOV 103, the modification of the first detection model may only occur in presence of IR image data associated with the first FOV 103 (e.g., or in the absence of IR image data associated with other FOVs).

Figure 4:
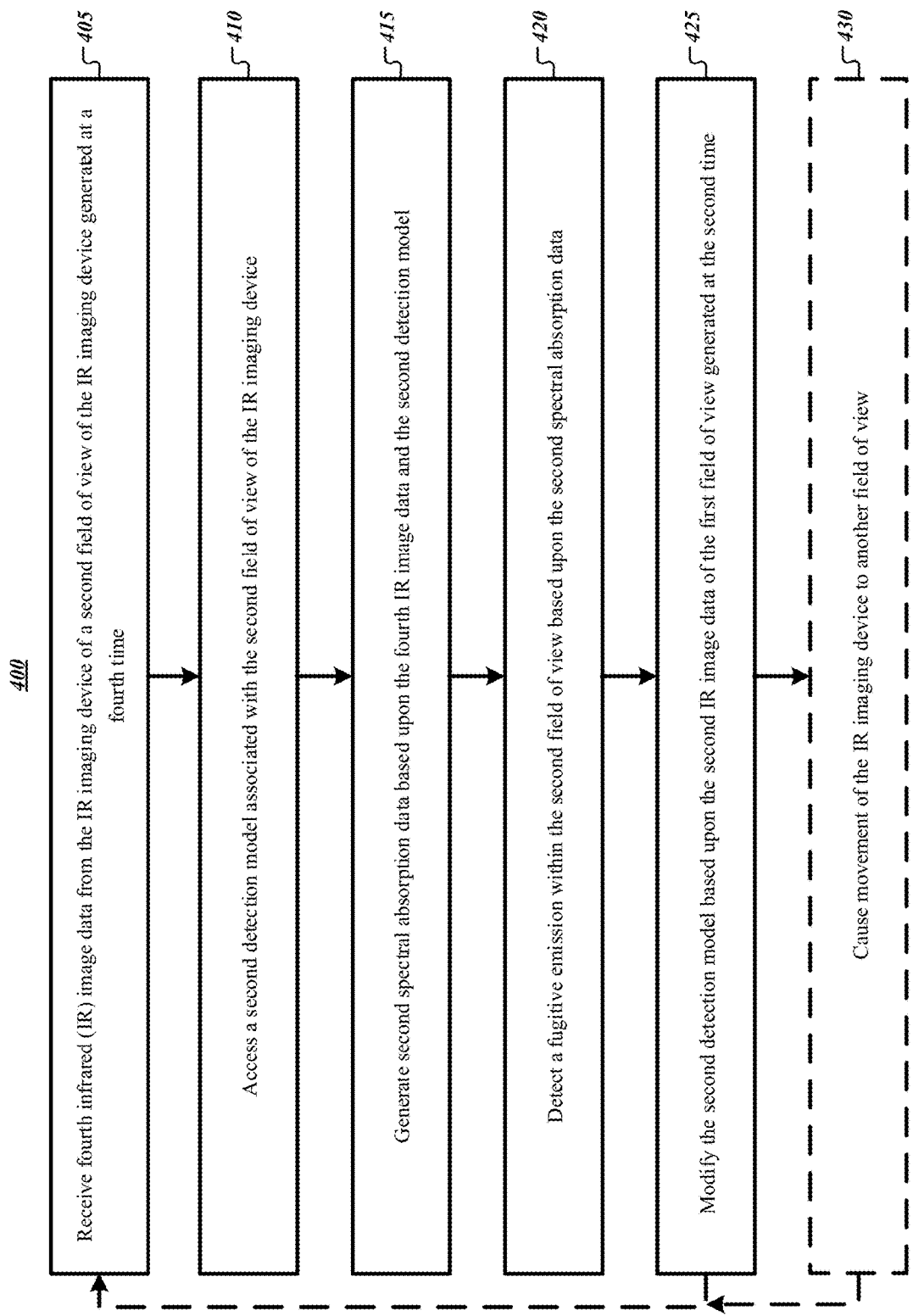
FIG. 4 illustrates an example flowchart for multi-model fugitive emission determinations, in accordance with some example embodiments described herein.

As described hereafter with reference to operation 330 and the operations of FIG. 4, the computing device 200 may cause movement of the IR imaging device 102 to another FOV (e.g., second FOV 105). In order to reduce the computational burdens on the computing device 200, the modification of the first detection model may occur during the movement between FOVs. For example, the computing device 200 may be configured only to access the first detection model (e.g., an active first detection model) in response to receipt of IR image data associated with the first FOV 103. As such, any other detection models associated with respective, distinct FOVs (e.g., the second detection model or the like) may remain dormant or otherwise inactive. Furthermore, given that the first detection model is only used in conjunction with the first FOV 103, modification of the first detection model may occur during movement of the IR imaging device 102 to an example second FOV 105 in that the IR imaging device 102 does not access an associated second detection model as described hereafter until directed towards the second FOV 105. In conventional single model systems, the models used must be reactivated at each position (e.g., each FOV) such that these conventional models are refreshed and re-trained at each position resulting in an extensive computational burden on these conventional systems without further benefit on the fugitive emission determinations by these systems. In other words, these conventional, single model systems are incapable of leveraging the historical IR image data generated at a particular FOV in subsequent determination operations.

As would be evident in light of the present disclosure, operations 305-325 may be iteratively performed as part of a feedback look, trainable logic model, or other machine learning technique (e.g., reinforcement learning or the like). A user associated with the system 100 may review the second IR image data one or more parameters or outputs of the first detection model, and/or the like of the system 100 and may, for example, confirm that a gas leak (e.g., fugitive emission 20) is present (e.g., a supervised or reinforcement learning technique).

In some embodiments, as shown at operation 330, the apparatus (e.g., computing device 200) includes means, such as processor 202, communications circuitry 208, image processing circuitry 210, machine learning circuitry 212, or the like, for causing movement of the IR imaging device 102 to a second FOV 105. As described above, the IR imaging device 102 may leverage a schedule of movement operations that define particular movements of the IR imaging device 102 relative its environment. For example, the schedule of movement operations may define particular physical locations at which the IR imaging device 102 is to be directed, such as via pan, tilt, pivot, or any movement operation configured to modify the position of the IR imaging device such that the FOV changes. In some embodiments, the particular FOVs at which the IR imaging device 102 generates IR image data may be associated with particular locations at which fugitive emissions 20 are more likely to occur (e.g., junctions between vessels, gas input locations, high-traffic or interaction areas, etc.). The present disclosure contemplates that the IR imaging device 102 may be configured to generate IR image data associated with any number of FOVs (e.g., first FOV 103, second FOV 105, . . . $n^{th}$ FOV, etc.) based upon the intended application of the system 100. In the particular operations of FIG. 3, operation 330 may cause the IR imaging device 102 to move (e.g., tilt, pan, etc.) to a position associated with the second FOV 105 so as to perform the operations of FIG. 4 as described hereafter.

FIG. 4 illustrates a flowchart containing a series of operations for multi-model fugitive emission determinations. The operations illustrated in FIG. 4 may, for example, be performed by, with the assistance of, and/or under the control of an apparatus (e.g., computing device 200), as described above. In this regard, performance of the operations may invoke one or more of processor 202, memory 204, input/output circuitry 206, communications circuitry 208, image processing circuitry 210, and/or machine learning circuitry 212.

As shown in operation 405, the apparatus (e.g., computing device 200) includes means, such as processor 202, communications circuitry 208, image processing circuitry 210, or the like, for receiving fourth infrared (IR) image data from the IR imaging device 102 associated with a second FOV 105 of the IR imaging device 102 generated at a fourth time. The fourth IR image data generated by the IR imaging device 102 may include a plurality of data entries, one or more of which may be associated with particular pixels that represent the second FOV 105 of the IR imaging device 102. As shown in FIG. 1, the fourth IR image data may also include one or more data entries associated with or otherwise indicative of the fugitive emission 20 from the emission source 10. For example, the fourth IR image data may be indicative of the intensity of the IR radiation received by the IR imaging device 102 for each pixel captured for the second FOV 105. The receipt of this fourth IR image data from the IR imaging device 102 may occur substantially the same as described above with reference to FIG. 3.

As shown in operation 410, the apparatus (e.g., computing device 200) includes means, such as processor 202, communications circuitry 208, image processing circuitry 210, or the like, for accessing a second detection model associated with the second FOV 105 of the IR imaging device 102. The second detection model may be distinctly associated with the second FOV 105 in that the second detection model is trained solely on IR image data associated with the second FOV 105. For example, the second detection model may be generated based at least in part upon third IR image data of the second FOV 105 of the IR imaging device 102 generated at a third time that is earlier in time than the fourth time (e.g., the time at which the fourth IR image data is generated). Similar to the first FOV 103, the computing device 200 may iteratively receive IR image data generated by the IR imaging device 102 at various times that is associated with the second FOV 105.

The second detection model, as described above, may be independent of other detection models (e.g., the first detection model) leveraged by the system 100. By way of continued example, the second detection model may only be associated with the second FOV 105 so as to avoid an unintentional impact of IR image data associated with other FOVs (e.g., the impact of second IR image data) on the IR image-based determinations associated with the second FOV 105. As such, the access by the computing device at operation 410 of the second detection model may only occur in presence of IR image data associated with the second FOV 105 (e.g., or in the absence of IR image data associated with other FOVs). In some embodiments described hereafter with reference to operation 425, the second detection model may be accessed, modified, or otherwise used during a movement operation of the IR imaging device from the second FOV 105 such that the subsequent generation of IR image data associated with another FOV (e.g., first FOV 103 or the like) halts access to the second detection model. As noted above, the second detection model may be commonly stored amongst a plurality of detection models, including the first detection model or otherwise, and selectively accessed by the computing device 200, such as in response to receipt of IR image data (e.g., fourth IR image data) from the IR imaging device associated with the second FOV 105.

As shown in operation 415, the apparatus (e.g., computing device 200) includes means, such as processor 202, communications circuitry 208, image processing circuitry 210, or the like, for generating spectral absorption data based upon the fourth IR image data and the second detection model. Similar to the operations of FIG. 3, the fourth IR image data received at operation 405 may refer to a hyperspectral image cube in which a given x/y location or position in a traditional red/blue/green (rgb) visual camera also includes various IR radiation values (e.g., lambda 1, lambda 2, etc.) indicative of the intensity of the IR radiation received by the IR imaging device 102 for each pixel captured for the second FOV 105. In order to convert this IR image data for use in subsequent determinations, the computing device 200 may leverage one or more radiative transfer models. The radiative transfer model may operate to estimate the absorption observed by the IR imaging device 102 in that the fourth IR image data may be supplied to the radiative transfer model as inputs, and the radiative transfer model may, for example, output various parameters associated with each pixel within the fourth IR image data. In this way, the second detection model may, in whole or in part, operate as a radiative transfer model trained on IR image data of the second FOV 105.

As would be evident in light of the present disclosure, the spectral absorption data may refer to the spectrum of absorption lines, bands, etc. that may result from the radiation (e.g., light) produced by a heated source (e.g., having a temperature differential with an ambient environment of the source (e.g., fugitive emission 20)). By way of a non-limiting example, the source (e.g., fugitive emission 20) that produces a continuous spectrum passes through a relatively cooler gas, and the associated absorption spectrum is indicative of the fraction of incident electromagnetic radiation absorbed by the material over a range of frequencies. Although described with reference to a relatively cooler gas, the present disclosure contemplates that the absorption spectrum may be generated when a relatively warmer background light passes through a relatively cooler source (e.g., fugitive emission 20), or a relatively cooler background light passes through a relatively warmer source (e.g., a negative absorption example). Such a spectrum as associated with the spectral absorption data, may be used as described in operation 420 to detect a fugitive emission (e.g., the presence or an amount of gas) in a particular set of fourth IR image data. Although described herein with reference to an example radiative transfer model operating in whole or in part as the second detection model, the present disclosure contemplates that any mechanism for converting IR image data to spectral absorption data may be used by the computing device 200, including but not limited to, various absorption estimation models, absorption generation models, and/or the like.

Thereafter, as shown in operation 420, the apparatus (e.g., computing device 200) includes means, such as processor 202, communications circuitry 208, image processing circuitry 210, machine learning circuitry 212, or the like, for determining a gas amount associated with the fugitive emission based upon the spectral absorption data. Similar to the operations of FIG. 3, the spectral absorption data generated based upon the fourth IR image data may be used to determine or otherwise estimate the presence or concentration of gas (e.g., fugitive emission 20) for each pixel due to the difference between energy levels for the absorption lines or bands of distinct elements at various wavelengths. As such, the present disclosure contemplates that the computing device 200 may operate to determine an amount of gas associated with the fourth IR image data (e.g., represented by the pixels captured by the IR imaging device 102 at a particular time) via various techniques, including but not limited to foreground estimations, background estimations, times series analyses, or the like.

Thereafter, as shown in operation 420, the apparatus (e.g., computing device 200) includes means, such as processor 202, communications circuitry 208, image processing circuitry 210, machine learning circuitry 212, or the like, for detecting a fugitive emission 20 within the second FOV 105 based upon the second spectral absorption data. As described above, the spectral absorption data generated based upon the fourth IR image data and the second detection model may be used to determine or otherwise estimate the presence or concentration of gas (e.g., fugitive emission 20) for each pixel due to the difference between energy levels for the absorption lines or bands of distinct elements at various wavelengths. As such, the present disclosure contemplates that the computing device 200 may operate to determine an amount of gas associated with the fourth IR image data (e.g., represented by the pixels captured by the IR imaging device 102 at the fourth time) via various techniques, including but not limited to foreground estimations, background estimations, times series analyses, or the like. By way of example, the computing device 200 may determine a gas amount that refers to the path-concentration on a pixel by pixel basis of the fourth IR image data (e.g., in parts-per-million-meter (ppm-m) or the like). Such a gas amount may, based upon comparisons with one or more thresholds, be used to determine the presence or absence of a fugitive emission 20 in the second FOV 105.

Thereafter, as shown in operation 425, the apparatus (e.g., computing device 200) includes means, such as processor 202, communications circuitry 208, image processing circuitry 210, machine learning circuitry 212, or the like, for modifying the second detection model based upon the fourth IR image data of the second FOV 105 generated at the fourth time. Similar to the operations of FIG. 3, the second detection model may be distinctly associated with the second FOV 105 in that the second detection model is trained solely on IR image data associate with the second FOV 105. As such, the second detection model may be similarly trained based upon the fourth IR image data generated by the IR image device 102 at the fourth time of the second FOV 105 so as to improve subsequent determinations associated with the second FOV 105. Given that the second detection model may only be associated with the second FOV 105 so as to avoid an unintentional impact of IR image data associated with other FOVs on the IR image-based determinations associated with the second FOV 105, the modification of the second detection model may similarly only occur in presence of IR image data associated with the second FOV 105 (e.g., or in the absence of IR image data associated with other FOVs). As would be evident in light of the present disclosure, operations 405-425 may be iteratively performed as part of a feedback look, trainable logic model, or other machine learning technique (e.g., reinforcement learning or the like). A user associated with the system 100 may review the fourth IR image data one or more parameters or outputs of the second detection model, and/or the like of the system 100 and may, for example, confirm that a gas leak (e.g., fugitive emission 20) is present (e.g., a supervised or reinforcement learning technique).

In some embodiments, as shown at operation 430, the apparatus (e.g., computing device 200) includes means, such as processor 202, communications circuitry 208, image processing circuitry 210, machine learning circuitry 212, or the like, for causing movement of the IR imaging device 102 to a another FOV. Although described herein with reference to a first FOV 103 and a second FOV 105, the present disclosure contemplates that the IR imaging device 102 may directed to any number of FOVs, each of which may be associated with distinct detection models. As such the operations of FIG. 4 may occur iteratively for each of these subsequent or other FOVs. Furthermore, the present disclosure contemplates that the movement of the IR imaging device 102 to any particular FOV may also occur in response to a user or operator input requesting the same.

FIGS. 3-4 thus illustrate flowcharts describing the operation of apparatuses, methods, and computer program products according to example embodiments contemplated herein. It will be understood that each flowchart block, and combinations of flowchart blocks, may be implemented by various means, such as hardware, firmware, processor, circuitry, and/or other devices associated with execution of software including one or more computer program instructions. For example, one or more of the operations described above may be implemented by an apparatus executing computer program instructions. In this regard, the computer program instructions may be stored by a memory 204 of the computing device 200 and executed by a processor 202 of the computing device 200.

As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the functions specified in the flowchart blocks. The computer program instructions may also be loaded onto a computer or other programmable apparatus to cause a series of operations to be performed on the computer or other programmable apparatus to produce a computer-implemented process such that the instructions executed on the computer or other programmable apparatus provide operations for implementing the functions specified in the flowchart blocks.

The flowchart blocks support combinations of means for performing the specified functions and combinations of operations for performing the specified functions. It will be understood that one or more blocks of the flowcharts, and combinations of blocks in the flowcharts, can be implemented by special purpose hardware-based computer systems which perform the specified functions, or combinations of special purpose hardware with computer instructions.

The invention claimed is:
1. An imaging system comprising:
an infrared (IR) imaging device configured to generate second IR image data of a first field of view of the IR imaging device at a second time; and
a computing device operably connected with the IR imaging device, wherein the computing device is configured to:
receive the second IR image data of the first field of view from the IR imaging device;

access a first detection model associated with the first field of view of the IR imaging device, wherein the first detection model is trained for the first field of view based at least in part upon one or more first IR images of the first field of view of the IR imaging device, wherein the first detection model is trained at a first time prior to the second time;

generate first spectral absorption data based upon the second IR image data and the first detection model;

detect a first fugitive emission within the first field of view based upon the first spectral absorption data;

cause movement of the IR imaging device to a second field of view to receive fourth IR image data of the second field of view from the IR imaging device;

generate second spectral absorption data based upon the fourth IR image data and a second detection model, wherein the second detection model is independent from the first detection model, wherein the second detection model is trained for the second field of view; and detect a second fugitive emission within the second field of view based upon the second spectral absorption data.

2. The imaging system according to claim 1, wherein the computing device is further configured to cause generation of the fourth IR image data of the second field of view of the IR imaging device at a fourth time.

3. The imaging system according to claim 2, wherein the computing device is further configured to modify the first detection model based upon the second IR image data of the first field of view generated at the second time during movement of the IR imaging device from the first field of view to the second field of view.

4. The imaging system according to claim 2, wherein the computing device is configured to cause movement of the IR imaging device according to a schedule for moving the IR imaging device.

5. The imaging system according to claim 2, wherein the computing device is further configured to generate the second spectral absorption data by:

accessing the second detection model associated with the second field of view of the IR imaging device, wherein the second detection model is trained for the second field of view based at least in part upon one or more third IR images of the second field of view of the IR imaging device at a third time prior to the fourth time, wherein the second detection model is different from the first detection model.

6. A computer-implemented method comprising:

receiving second infrared (IR) image data from an IR imaging device of a first field of view of the IR imaging device generated at a second time;

accessing a first detection model associated with the first field of view of the IR imaging device, wherein the first detection model is trained for the first field of view based at least in part upon one or more first IR images of the first field of view of the IR imaging device, wherein the first detection model is trained at a first time prior to the second time;

generating first spectral absorption data based upon the second IR image data and the first detection model;

detecting a first fugitive emission within the first field of view based upon the first spectral absorption data;

causing movement of the IR imaging device to a second field of view to receive fourth IR image data of the second field of view from the IR imaging device;

generating second spectral absorption data based upon the fourth IR image data and a second detection model, wherein the second detection model is independent from the first detection model, wherein the second detection model is trained for the second field of view; and detecting a second fugitive emission within the second field of view based upon the second spectral absorption data.

7. The computer-implemented method according to claim 6, further comprising causing movement of the IR imaging device to the second field of view such that the IR imaging device is configured to generate the fourth IR image data of the second field of view of the IR imaging device at a fourth time.

8. The computer-implemented method according to claim 7, further comprising modifying the first detection model based upon the second IR image data of the first field of view generated at the second time during movement of the IR imaging device from the first field of view to the second field of view.

9. The computer-implemented method according to claim 7, wherein generating the second spectral absorption data comprises:

accessing the second detection model associated with the second field of view of the IR imaging device, wherein the second detection model is trained for the second field of view based at least in part upon one or more third IR images of the second field of view of the IR imaging device, wherein the first detection model is trained at a third time prior to the fourth time.

10. A computer program product comprising at least one non-transitory computer-readable storage medium having computer program code thereon that, in execution with at least one processor, configures the computer program product for:

receiving second infrared (IR) image data from an IR imaging device of a first field of view of the IR imaging device generated at a second time;

accessing a first detection model associated with the first field of view of the IR imaging device, wherein the first detection model is trained for the first field of view based at least in part upon one or more first IR images of the first field of view of the IR imaging device, wherein the first detection model is trained at a first time prior to the second time;

generating first spectral absorption data based upon the second IR image data and the first detection model; and detecting a first fugitive emission within the first field of view based upon the first spectral absorption data;

causing movement of the IR imaging device to a second field of view to receive fourth IR image data of the second field of view from the IR imaging device;

generating second spectral absorption data based upon the fourth IR image data and a second detection model, wherein the second detection model is independent from the first detection model, wherein the second detection model is trained for the second field of view; and detecting a second fugitive emission within the second field of view based upon the second spectral absorption data.

* * * * *